E. J. HUGHES.
FLANGE JOINT MEMBER AND PROCESS OF PRODUCING FLANGE JOINT MEMBERS.
APPLICATION FILED JUNE 8, 1917.
1,291,645.
Patented Jan. 14, 1919.
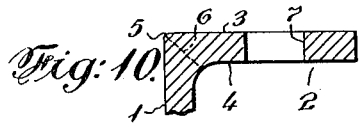
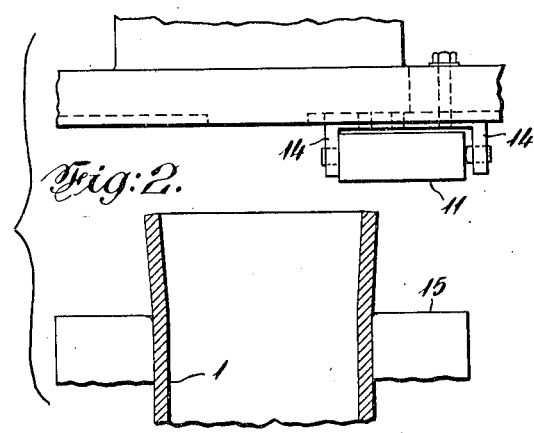
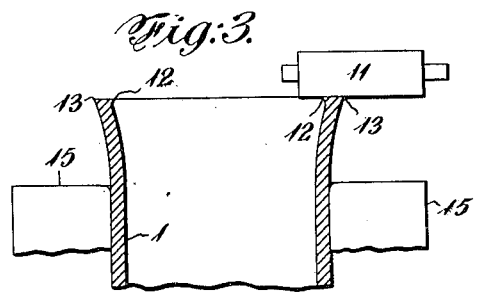
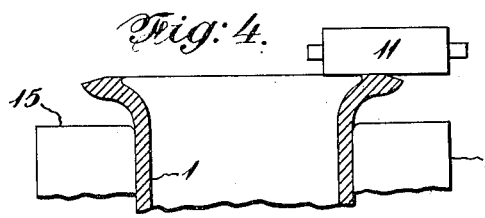
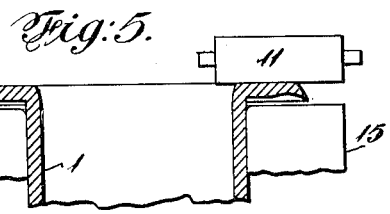
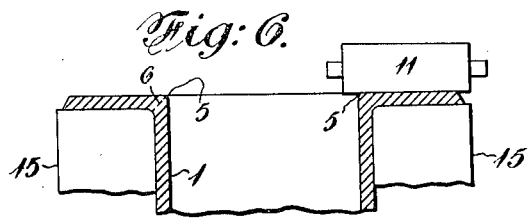
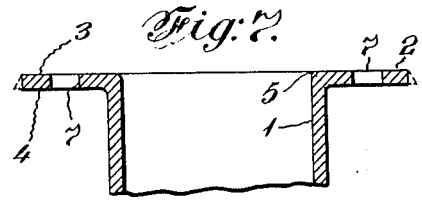
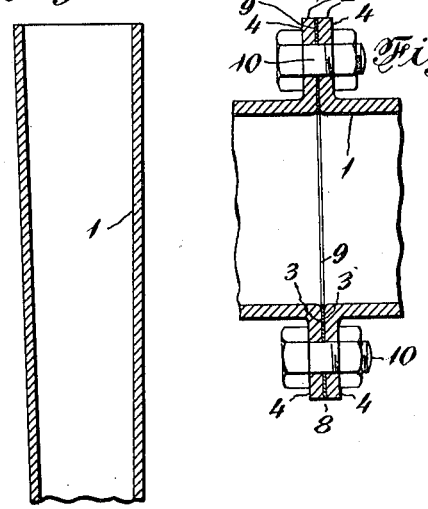
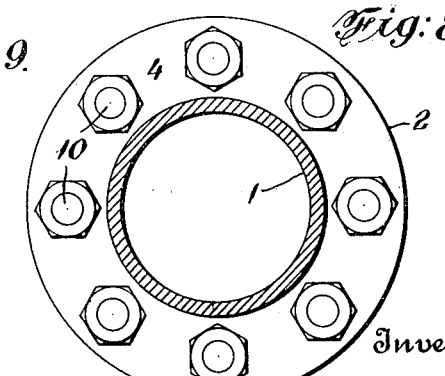
Inventor
Edward J. Hughes
By — Attorney

UNITED STATES PATENT OFFICE.

EDWARD J. HUGHES, OF BLOOMFIELD, NEW JERSEY.

FLANGE-JOINT MEMBER AND PROCESS OF PRODUCING FLANGE-JOINT MEMBERS.

1,291,645.            Specification of Letters Patent.          Patented Jan. 14, 1919.

Application filed June 8, 1917. Serial No. 173,493.

*To all whom it may concern:*

Be it known that I, EDWARD J. HUGHES, a citizen of the United States, and a resident of Bloomfield, in the county of Essex and State of New Jersey, have invented certain new and useful Improvements in Flange-Joint Members and Processes of Producing Flange-Joint Members, of which the following is a specification.

The present invention relates generally to flange joint members analogous to the well known Van Stone joint.

The so-called Van Stone flange joint consists of a ductile iron pipe having at its end a relatively narrow-width integral radial flange, and provided with a reinforcing collar of relatively large diameter for the reception of bolts to fasten adjacent pipe sections together.

Since the circumference of the flange is greater than that of the pipe, it is now the practice to compensate for this increase by gradually thinning out the metal of the body of the flange into taper formation so that the two faces thereof are not parallel. The metal, however, cannot be upset in this manner to any but a very limited extent, because it renders the flange weak, and because of the production of radial fissures. Besides, if the face of the flange is machined the thickness of the flange will be still further reduced, which in some forms tends not merely to weaken the flange itself but also to materially reduce the amount of metal at the bend of the flange and pipe. These conditions are well understood in the art and account for the necessity of using reinforcing collars for the support of bolts.

The main object of this invention is to devise a process of flanging the ends of pipes whereby the flange will have at least substantially the same thickness as the wall of the pipe, throughout its extent, so that the flange will have the same power of resistance to stresses as the pipe itself.

Another object of this invention is to produce a structure wherein the flange of the pipe is inherently capable of supporting bolts, so that the reinforcing collar may be altogether dispensed with.

In the prior art it has always been attempted heretofore to control and guide or confine the flow of the metal in some way during the rolling operation. This has been done in many ways, too numerous to mention here, but a typical method has been to initially act upon the end of the pipe by means of conical rollers, thereby attempting to turn, so to speak, the flange from a definite point, and thereafter to use flattening rollers to bring the flange into a plane substantially at right angles to the axis of the pipe. In other cases, it has been the custom to otherwise initially direct the flow of the metal, and to prevent it from taking what might be called its natural path. I have found that, if the metal is given an unobstructed radial flow, due to rolling the end of the pipe under pressure exerted in a direction substantially parallel to the axis of the pipe, the flange so produced will not be gradually thinned out, but can be made of substantially uniform thickness throughout its extent at least equal to substantially the thickness of the wall of the pipe; and, further, that in this way the bend of the pipe and flange may actually be strengthened, because of an inward displacement of the metal which takes place, to form what may be called a square corner at said bend. This method enables me to roll a much stronger flange that may be used in the ordinary way in connection with reinforcing collars for the bolts, and which also permits the flange to be rolled into an undercut groove in such reinforcing collars to firmly unite the flange and reinforcing collar; but, even further than this, it has enabled me to produce a flange of such character that separate reinforcing collars may be altogether dispensed with and bolts may be passed directly through the flange to secure it to another flange of like character.

One phase of the invention consists in rolling the heated end of the pipe under pressure exerted in a direction substantially parallel to the axis of the pipe into a flange formation produced by the unobstructed flow of the metal under such pressure, and then continuing the rolling operation in the same direction with the back of the flange against an abutment member extending substantially at right angles to the axis of the pipe. The flange thus produced is what may be called a single-layer circumferential flange, that is to say, the metal is not doubled back upon itself. The effect of so rolling the end of the pipe is to produce a single layer of metal which is of greater thickness than the wall of the pipe, which thickness is reduced when the flange is rolled against the abutment member; this final action tending to still further increase the diameter of the flange by displacing metal both outwardly and inwardly; such inward displacement of metal producing what is here called a substantially square corner at the bend of the pipe and flange. The reason that the rolling operation produces a flange which is thicker than the wall of the pipe, is that, at the very commencement of the rolling operation, the metal at the end of the pipe is displaced outwardly and also to a very slight extent inwardly, and that, thereafter, the continued rolling operation displaces both said outwardly and inwardly extending portions in an outward direction.

Another phase of the invention resides in rolling the heated end of the pipe to produce both inwardly and outwardly extending portions, then displacing both of said portions outwardly, by rolling, to produce a flange thicker than the wall of the pipe, and then rolling said portion to increase its area and to reduce its thickness. In addition to the foregoing the final rolling which takes place against the abutment member and which reduces the thickness of the flange has the effect of displacing metal both outwardly and inwardly, the latter to produce the square corner previously alluded to.

Another phase of the invention consists in producing an initial appreciable deformation of the end of the pipe by expansion due to heat, and preferably also by clamping the pipe near the end, thereby localizing the deformation at the end of the pipe, and then outwardly upsetting the heated end of the pipe by rolling it under pressure applied in a direction substantially parallel to the axis of the pipe. This initial appreciable deformation of the end of the pipe by expansion due to heat enables me to thereafter roll the pipe by applying pressure solely in a direction substantially parallel to the axis of the pipe, since, otherwise, there would be nothing to prevent the metal from flowing inwardly to produce an inwardly extending flange instead of, or in addition to, an outwardly extending flange.

Another feature of the invention consists of a flange joint member comprising: a ductile iron pipe having an integral radial flange at its end, inherently capable of supporting bolts proportionate, in number and diameter, to the diameter of the pipe.

In carrying out this feature of the invention, the thickness of the metal at the bend of the flange and pipe is appreciably greater than that of the flange and wall of the pipe, and the flange consists of an outwardly rolled single layer lap of a substantially uniform thickness throughout substantially equal to the thickness of the wall of the pipe.

Another feature of the invention resides in a flange joint comprising: a plurality of ductile iron pipe sections having intermediate radial portions, each radial portion consisting of two radial flanges, one integral with each section, arranged face to face, and each flange consisting of an outwardly rolled lap having parallel faces, and of a uniform thickness throughout substantially equal to the thickness of the wall of the pipe, and of a diameter sufficient to afford space for the reception of bolts of requisite size and number, and bolts passing through said radial portions.

The invention is disclosed in the accompanying drawings in which,

Figure 1 is a sectional view of the heated end of a pipe.

Fig. 2 is a diagrammatic view showing the first stage of operation, the pipe being clamped and the roller being in its retracted position.

Fig. 3 is a diagrammatic view showing the commencement of the rolling action and its effect upon the pipe.

Figs. 4 and 5 are diagrammatic views showing intermediate stages of the rolling operation.

Fig. 6 is a diagrammatic view showing the final stage of the rolling operation.

Fig. 7 is a sectional view showing the finished product.

Fig. 8 is a sectional view taken at right angles to Fig. 9.

Fig. 9 shows two members bolted together.

Fig. 10 is a detail sectional view of one corner of the flanged end of the pipe.

Referring more particularly to Figs. 7, 8, 9 and 10, 1 indicates the pipe of ductile iron. By this is meant Bessemer or open hearth steel or wrought iron or other "workable" iron products distinguished in characteristics from cast iron. This pipe is provided at its end with an integral radial single layer flange or lap 2, of a thickness throughout substantially equal to that of the wall of the pipe, whose opposite faces 3 and 4 are parallel, and having a continuous circumference. Also this pipe and flange is provided with a square corner 5 so that the metal at the bend, measured by the line 6, is preferably appreciably thicker than the wall of the pipe. Bolt holes 7 are formed on this flange of the requisite diameter and number in proportion to the diameter of the pipe itself.

When two of these pipes are placed together, we obtain the product shown in Fig. 9. This product has a radial portion 8 consisting of two flanges 2, one integral with each pipe section 1, and each flange of the character previously described. 9 is a gasket which may be interposed between the two flanges. It will be noted that the front and back faces 3 and 4 of each flange are parallel and that the bolts 10 pass through the bolt holes 7 in opposite flanges securing the sections together, thereby forming a joint without the necessity of using reinforcing collars.

The value and importance of the flange joint member herein disclosed will be more readily appreciated by a comparison with the ordinary Van Stone joint now in use. In present day practice an 18" pipe requires sixteen 1 2/16" bolts (size of bolt heads 2.09 or about 2 1/16"). In order to provide sufficient space and clearance for these bolts and their heads, it is usual to have a bolt circle of a diameter of 22 12/16" and consequently a reinforcing collar of 25" diameter. But the diameter of the ordinary lap on an 18" pipe is only 21 8/16" giving a width (radius) of lap (when we deduct the outside diameter of pipe, 18") of only 1 12/16" from outside wall of pipe. This width of 1 12/16" is obviously insufficient to support sixteen bolts of 1 2/16" diameter with 2 1/16" heads. Yet a 1 12/16" lap is substantially the widest lap that can be made without thinning out the metal unduly, and that lap is not as wide as the diameter of the heads of the bolts proportionate to the diameter of the pipe and necessary to secure the sections together.

It will of course be understood that these proportions hold good throughout the range of various diameters of pipe. That is to say: the same relation of proportions (or more correctly lack of proportion) appears in each instance. Thus a 4" pipe (the actual outside diameter of which is 4 8/16") requires eight 10/16" bolts (head diameter 1 4/16"). A bolt circle diameter of 7 8/16" is therefore required and a reinforcing collar of 9" is used. The diameter of the flange in this instance is 6 10/16", which, when we deduct the outside diameter of pipe, gives a width of lap of only 1 1/16". Obviously eight bolts having heads of a diameter of 1 4/16" cannot be supported on a flange 1 1/16" in width.

Referring more particularly to Fig. 10, I have there indicated the method of arriving at the width of the lap necessary in the production of my invention. The illustration used is that of a 4" pipe. The size of the bolt is 10/16" and the bolt head is 1 4/16". The clearance necessary between the bolt head and the outer wall of the pipe and between the bolt head and the periphery of the flange will of course vary and might be 2/16" in each case. For the sake of allowing ample room we will say that it is 4/16" in each case. The width of the flange should therefore be 2 12/16". The diameter of the flanged end would therefore total 8", and the bolt circle diameter would be 6 4/16". These figures are less than the respective figures of 9" and 7 8/16" of the reinforcing collar used on the ordinary Van Stone joint.

The result is that while the lap of the pipe of this invention is greater than the lap of the ordinary Van Stone joint, the diameter of the flanged end of the pipe is less than the diameter of the reinforcing collar of the Van Stone joint. It is obvious that the elimination of the separate reinforcing collar is a great saving, not only of material and labor, but also in the cost of shipment, since it is the custom to ship the ordinary Van Stone joint with the reinforcing collars in position on the pipe.

Turning now our attention to Figs. 1 to 6 inclusive, the process of producing the flanged joint will be briefly described. The pipe 1 is first heated, as in Fig. 1, to produce an appreciable outward deformation thereof. The heated end of the pipe is then inserted in the jaws 15 of a suitable clamp. This clamping action tends to localize the expanded portion of the pipe as shown in Fig. 2. The roller 11, mounted on a rotatable disk whose center of rotation is coincident with the axis of the pipe, is now caused to approach the heated end of the pipe until it engages therewith. The first effect of this engagement is to produce both inwardly and outwardly extending portions 12 and 13 on the pipe as shown in Fig. 3. The continued action of the roller now rolls both the inwardly and outwardly extending portions 12 and 13 in an outward direction to produce a flange formation thicker than the wall of the pipe, substantially as indicated in Fig. 4. The further action of the roller tends to displace metal outwardly still further while shifting the flange bodily into what may be called successive parallel planes as indicated in Fig. 5. This continues until the back of the flange reaches the face of the jaws 15 when the flange is still further increased in diameter by both outward and inward displacement of the metal thereby reducing the thickness of the flange, if desired, back to that of the wall of the pipe. During this last stage the inward displacement of the metal produces what may be called the square corner 5 at the bend so that the metal at that point measured by the line 6 is appreciably greater than the thickness of the wall of the pipe. The resultant product has a flange which is of uniform thickness throughout, instead of being thinned out. The width of the flange produced can of course be regulated by the length of the pipe projected through the jaws 15 of the clamp. As shown in Fig. 6, while the body of the flange is not thinned out, there is a taper on the periphery which seems to form naturally under the rolling action. This taper may be removed by machining as indicated in Fig. 7. A feature of this process is that the metal is rolled out without any attempt to guide it. That is to say: the metal has an unobstructed radial flow during the rolling action, and the initial inward displacement of the metal seems to render available a sufficient body of metal at all times to insure a sufficient uniform thickness of flange and to prevent the formation of radial fissures.

The roller 11 is mounted in bearings 14 and is free to rotate on its own axis. It is, of course, immaterial whether the work moves toward the roller, or whether the roller moves toward the work. Any suitable means may be utilized to effect the movement of the roller toward the work, but preferably a fluid pressure device is employed which acts continuously during the rolling operation to exert pressure in a direction parallel to the axis of the pipe.

It is equally evident that the back of the flange will be finished by the rolling operation and that when two flange joint members of the character indicated in Fig. 9 are placed face to face, with or without intervening gaskets, the backs of the said flanges will be parallel to permit the bolts to be brought home against such parallel backs.

While machining of the face of the flange is not strictly necessary, it is not intended to preclude it. For instance, in the form of the invention shown in Fig. 9, the flange could obviously be rolled to a greater thickness than the wall of the pipe and could thereafter be reduced by machining if desired.

In describing the material acted upon, the term "ductile iron" has been used. This is intended to be a broad general designation and to include such material as Bessemer or open hearth steel, wrought iron, as well as other "workable" iron products in contradistinction to cast iron.

Another form of product produced by the herein described process as well as a process subsidiary to the present one in which a flange is rolled into a groove in the usual reinforcing collar are shown and claimed in application Ser. No. 173,494.

I claim:

1. A flange joint member comprising: a ductile iron pipe having an integral radial flange at its end, inherently capable of supporting bolts proportionate, in number and diameter, to the diameter of the pipe.

2. A flange joint member comprising: a ductile iron pipe having an integral radial flange at its end inherently capable of supporting bolts of minimum size in proportion to the diameter of the pipe.

3. A flange joint member comprising: a ductile iron pipe having an integral radial flange at its end of a width greater than the heads of the minimum diameter of bolts proportionate to the diameter of the pipe plus clearance.

4. A flange joint member comprising: a ductile iron pipe having an integral flange at its end, extending substantially radially of the axis of the pipe, the thickness of the metal at the bend of the flange and pipe being appreciably greater than that of the flange and wall of the pipe, said flange consisting of an outwardly rolled single layer lap of a substantially uniform thickness throughout substantially equal to the thickness of the wall of the pipe.

5. A flange joint member comprising: a ductile iron pipe having an integral flange at its end, extending substantially radially of the axis of the pipe and having a continuous circumferential edge, said flange consisting of an outwardly extending lap of substantially uniform thickness throughout substantially equal to the thickness of the wall of the pipe and of a diameter sufficient to afford space for the reception of bolts of requisite size to hold the member against displacement when subjected to stresses.

6. A flange joint comprising: a plurality of ductile iron pipe sections having intermediate radial portions, each radial portion consisting of two radial flanges, one integral with each section, arranged face to face and each flange consisting of an outwardly rolled lap having parallel faces and of a uniform thickness throughout substantially equal to the thickness of the wall of the pipe and of a diameter sufficient to afford space for the reception of bolts of requisite size, and bolts passing through said radial portion.

7. A flange joint comprising: two ductile iron pipes each having an integral radial flange at its end whose front and rear faces are parallel, the front faces of said flanges arranged face to face, each of said flanges consisting of an outwardly rolled lap of uniform thickness throughout substantially equal to the thickness of the wall of the pipe and of a diameter sufficient to afford space for the reception of bolts of requisite size to hold the member of the joint against displacement.

8. The process of flanging the end of a ductile iron pipe which consists in heating the end of the pipe, then in rolling the heated end under pressure, exerted in a direction substantially parallel to the axis of the pipe to produce unobstructed flow of the metal, into a flange formation, and then in continuing, in the same direction, the rolling operation with the back of the flange against an abutment member that extends substantially at right angles to the axis of the pipe.

9. The process of flanging the end of a ductile iron pipe which consists in heating the end of the pipe, then in rolling the heated end to initially produce both inwardly and outwardly extending portions, then in displacing outwardly, by rolling, both of said portions to produce a flange thicker than the wall of the pipe, and then in rolling said flange to increase its area and to reduce its thickness.

10. The process of flanging the end of a ductile iron pipe which consists in heating the end of the pipe, then in rolling the heated end to initially produce both inwardly and outwardly extending portions, then in displacing outwardly, by rolling, both of said portions to produce a flange thicker than the wall of the pipe, and then in reducing the thickness of the flange, by rolling, to displace metal outwardly and also to displace metal inwardly and thereby forming a square corner at the bend of the flange and pipe.

11. The process of flanging the end of a ductile iron pipe which consists in heating the end of the pipe sufficiently to produce an appreciable outward deformation thereof, and then in outwardly upsetting the heated end by rolling it under pressure applied in a direction substantially parallel to the axis of the pipe.

12. The process of flanging the end of a ductile iron pipe which consists in heating the end of the pipe, sufficiently to produce an appreciable outward deformation of the end thereof, and in clamping the pipe near the end, to localize said deformation and then in outwardly upsetting the heated end by rolling it under pressure applied in a direction substantially parallel to the axis of the pipe.

13. The process of flanging the end of a ductile iron pipe which consists in heating the end of the pipe sufficiently to produce an appreciable outward deformation thereof, then in rolling the heated end under pressure, exerted in a direction substantially parallel to the axis of the pipe to produce unobstructed flow of the metal, into a flange formation, and then in continuing, in the same direction, the rolling operation with the back of the flange against an abutment member that extends substantially at right angles to the axis of the pipe.

14. The process of flanging the end of a ductile iron pipe which consists in heating the end of the pipe sufficiently to produce an appreciable outward deformation thereof, and clamping it near the end to localize said deformation then in rolling the heated end under pressure, exerted in a direction substantially parallel to the axis of the pipe to produce unobstructed flow of the metal, into a flange formation, and then in continuing, in the same direction, the rolling operation with the back of the flange against an abutment member that extends substantially at right angles to the axis of the pipe.

Signed at New York city, in the county of New York and State of New York, this 6th day of June 1917.

EDWARD J. HUGHES.